April 9, 1935.　　　　J. W. FREE　　　　1,997,296
APPARATUS FOR MAKING WELDED PIPE
Filed April 5, 1929　　　5 Sheets-Sheet 1
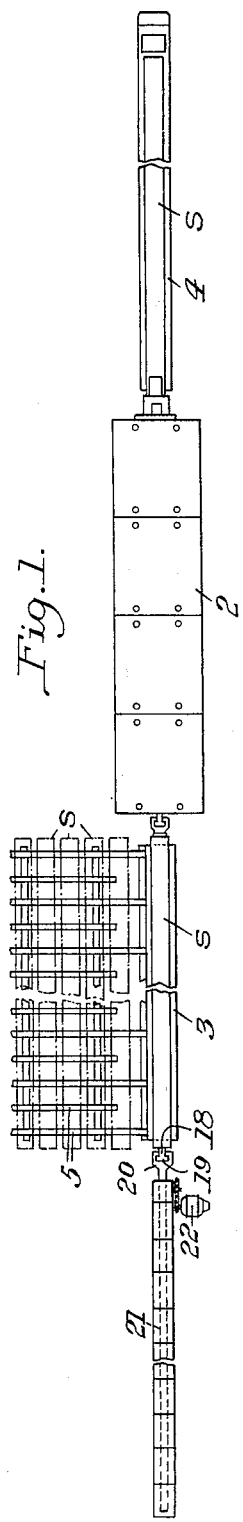
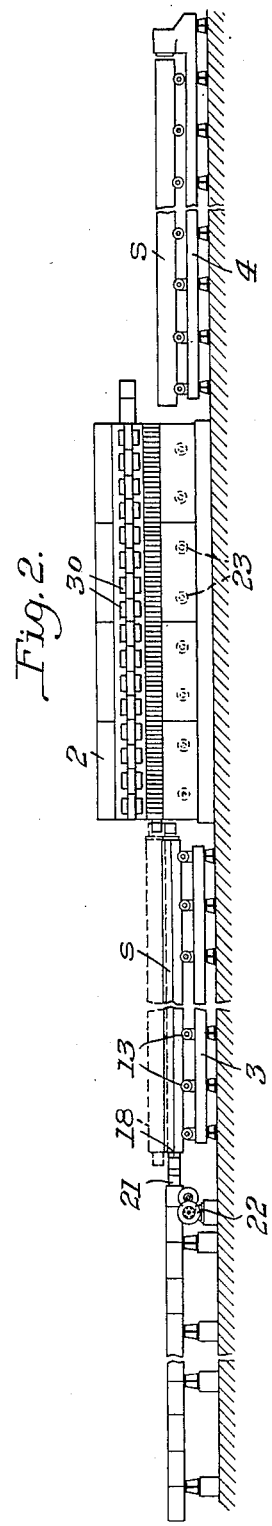
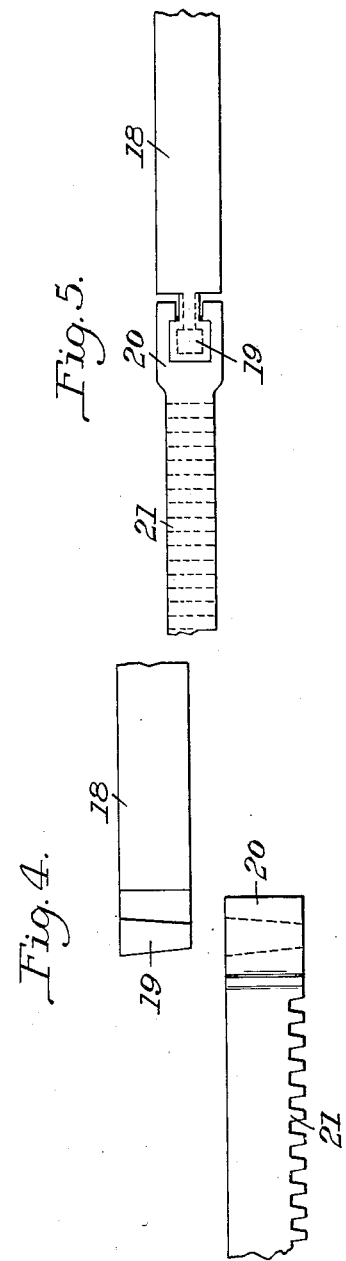
INVENTOR
John W. Free,
by his atty,
Byrnes, Stebbins & Parmelee April 9, 1935.  J. W. FREE  1,997,296
APPARATUS FOR MAKING WELDED PIPE
Filed April 5, 1929   5 Sheets-Sheet 2

INVENTOR
John W. Free

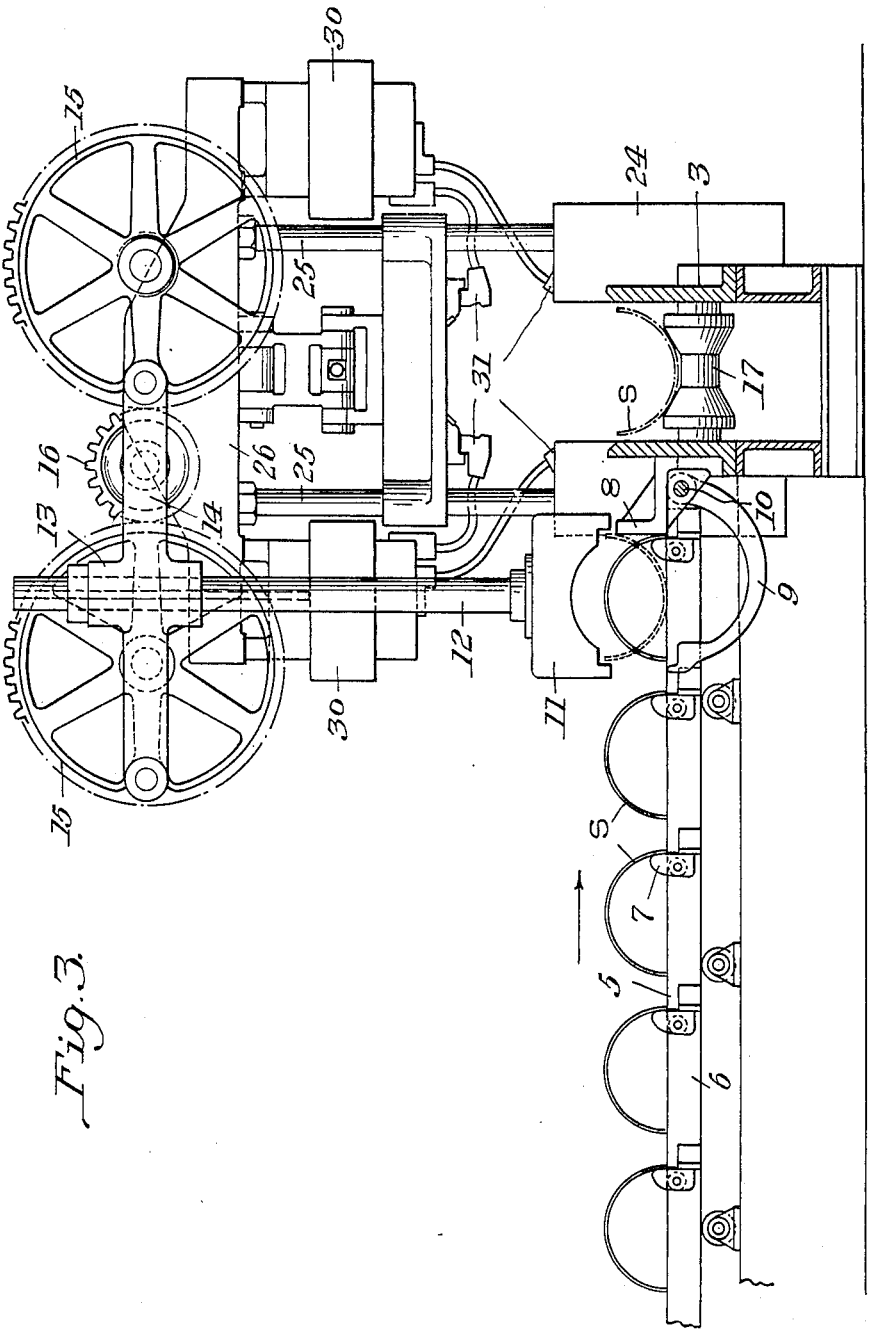

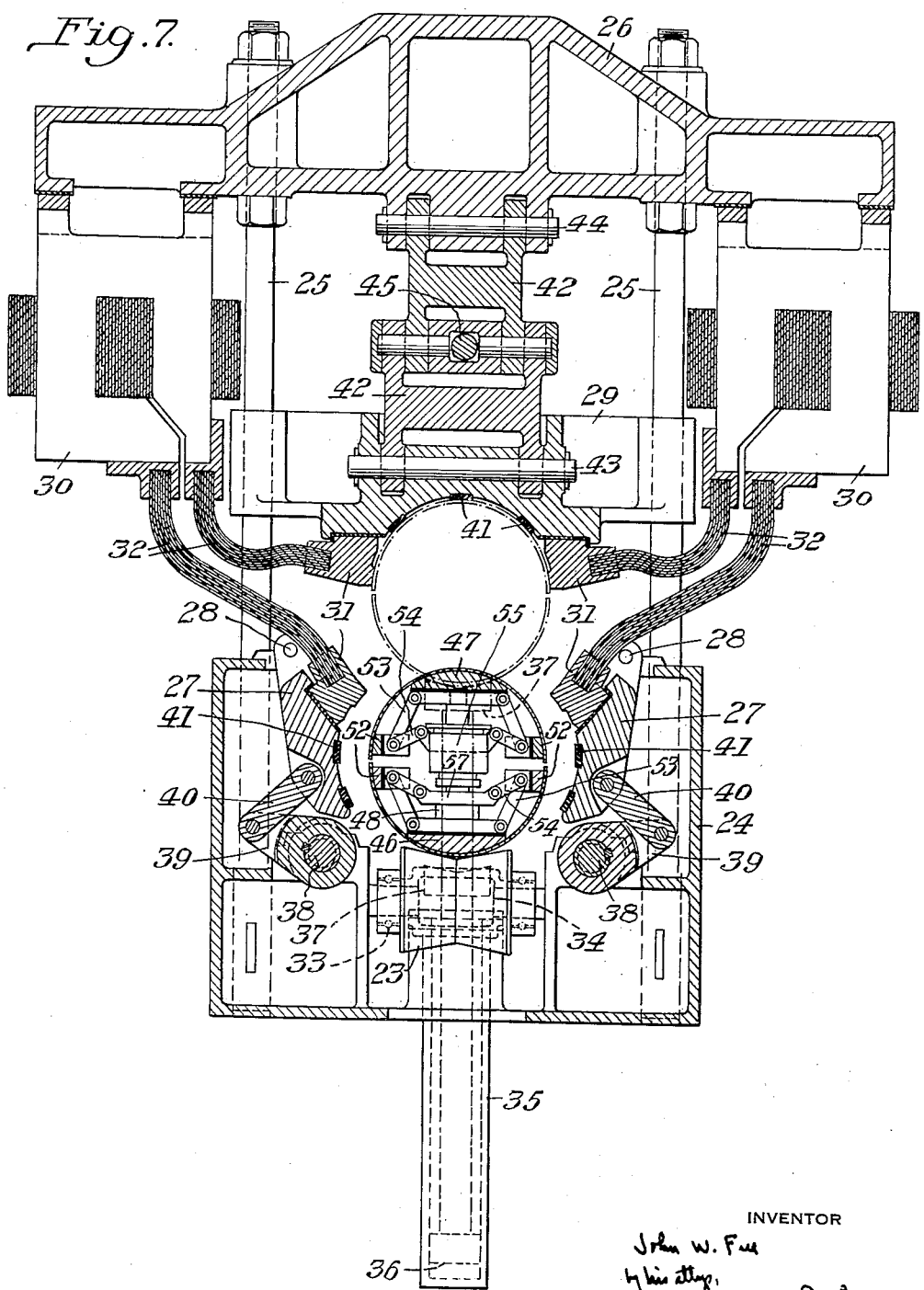

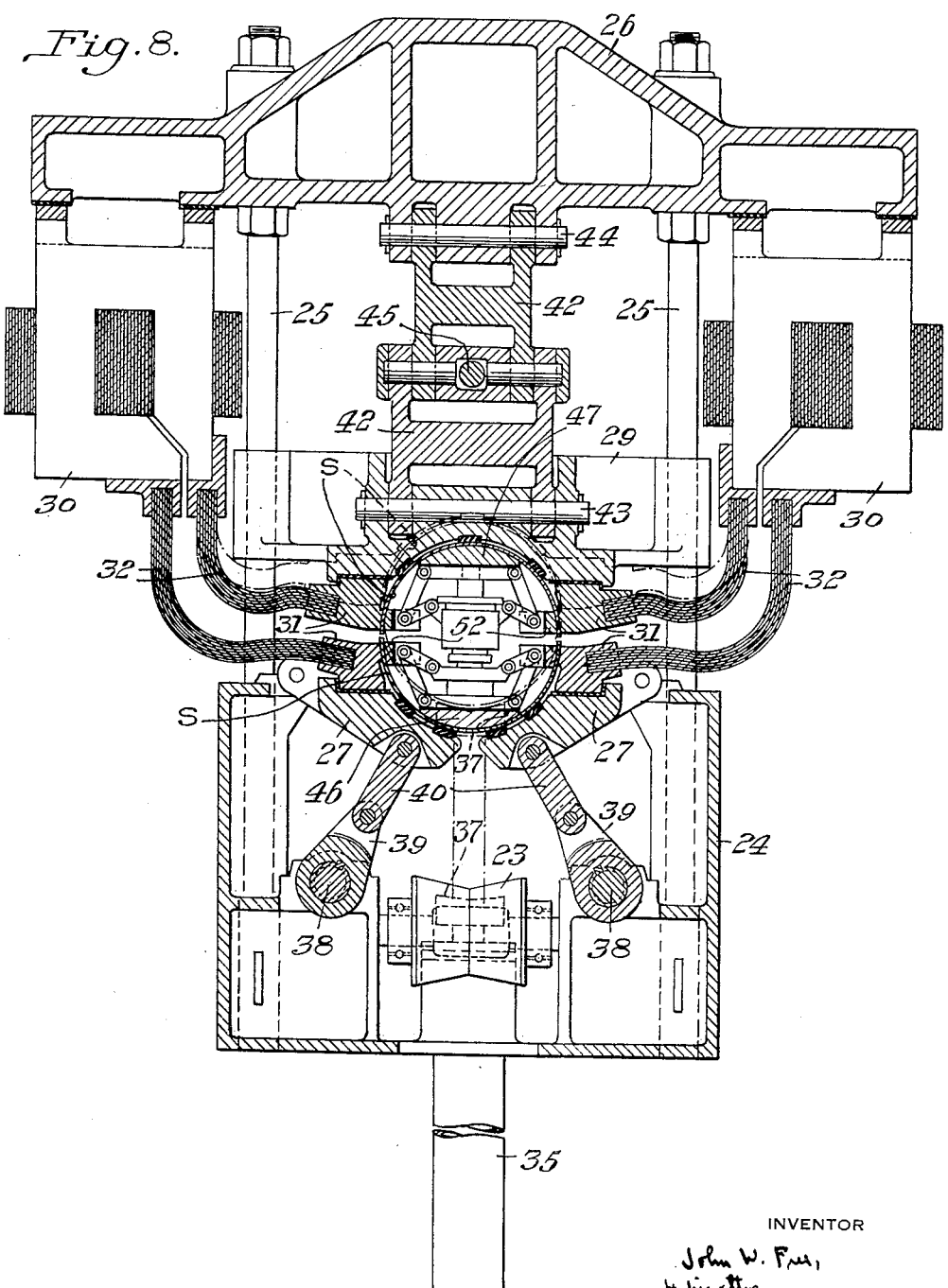

UNITED STATES PATENT OFFICE 1,997,296

APPARATUS FOR MAKING WELDED PIPE

John W. Free, Aliquippa, Pa., assignor to Jones & Laughlin Steel Corporation, Pittsburgh, Pa., a corporation of Pennsylvania Application April 5, 1929, Serial No. 352,736

15 Claims. (Cl. 219—6)

This invention relates to a method and apparatus for the manufacture of welded pipe, and particularly to the manufacture of pipe by the flash welding process, the word "pipe" being used in the broad sense and being intended to cover similar tubular sections as used for various purposes.

Flash welding is highly desirable in the manufacture of pipes, particularly in the larger sizes. Considerable difficulty is experienced, however, by reason of the great weight of the pipe sections to be handled. For example, in a pipe of 24 inch diameter, a single length of the completed pipe may weigh in the neighborhood of 4200 pounds.

Difficulty is encountered not only in assembling the sections, which may weigh as much as a ton or more each, but also in maintaining them in the proper relationship while in the flash welding machine and in exerting pressure on them in such manner as to insure proper contact between the pipe sections and the electrodes. A machine for the manufacture of such pipe must be capable of handling the heavy sections at relatively high speed and with a minimum of manual labor.

The pipe sections are supplied to the machine by a rack and usually lie on the rack all in the same position. I prefer to use pipe sections which are substantially semi-circular in shape, and it is therefore necessary to turn over every other pipe section on the rack in order to assemble the sections into form to be welded. I provide an assembly table adjacent the welding machine, and a transfer device between the rack and the assembly table adapted to handle pipe sections either side up. Provision is made for turning the pipe sections over on the rack, and the transfer device can therefore pick up a section regardless of which way it is turned and move it to the assembly table. A magnetic lift, movable from a position over the rack to a position over the table, is preferably employed.

In order to insure that the pipe sections will be properly positioned relative to one another, I provide a yieldable mandrel about which the pipe sections are assembled. Ordinarily, a pipe section will be laid on the assembly table with its edges upwardly, the mandrel will be placed in this pipe section, and the upper section will then be laid over the mandrel.

In the flash welding process the edges of the pieces to be joined are raised to a welding temperature by passing electric current through the pieces, and they are then brought together so as to burn away excess metal and supply the necessary pressure for joining the two hot edges together. The mandrel is made yieldable so that the edges will be held apart during the preliminary heating and may thereafter be brought together. I preferably employ a mandrel having portions which engage the pipe sections intermediate their edges with air cylinders which urge the pipe sections apart until the welding has been completed.

The electrodes are mounted in holders which embrace the pipe sections and provision is made for moving these holders relative to one another so as to bring the pipe sections together. In order to insure proper electrical contact between the pipe sections and the electrodes, I provide portions on the mandrel which engage the pipe sections adjacent their edges and apply pressure which insures the desired contact.

In the preferred machine, a mandrel with the pipe sections assembled therearound is moved into the welding machine on rollers and is then moved upwardly by lifting devices. The bottom holders are pivotally mounted and after the assemblage of pipe sections has been raised, the holders are swung into position beneath it. The electrodes on these pipe holders must lie adjacent the edges of the lower pipe section and fit very closely thereto. By reason of the pivotal mounting of the lower holders, difficulty would be experienced if it were attempted to simply raise the pipe to the position which is maintained during welding, and then swing the bottom holders into place. In order to insure proper clearance during the movement of the bottom holders, I provide for raising the pipe beyond its normal position and then lowering it into the bottom holders after they have been swung into their working position.

The top holder is arranged to move in a substantially straight line. Provision is made for moving the upper holder downwardly so as to bring the pipe sections into engagement with one another. Then after the edges have been heated the holder is moved in a further amount while the edges of the pipe sections are being burned away and finally through the period when the welding pressure is applied. The mandrel portions are relatively yieldable and move together as the top holder moves downwardly.

The top holder is moved in a straight line in order to insure that the pipe sections will be maintained in the proper relationship. The transformers which supply the welding current are mounted alongside the upper holder and flexible leads extend from this transformer to the upper holder and to the swinging bottom holders.

This arrangement results in a minimum of flexing of the leads in operation. The positioning of the transformers alongside the upper holders is also highly advantageous for the reason that only very short leads to the electrodes are necessary.

After the pipe has been welded the lifting members again engage it, the lower holders are swung out of the way and the completed pipe with the mandrel therein is lowered onto the conveyor rolls. The mandrel is collapsed and is withdrawn while the pipe is fed out of the machine onto a run-out table.

During the time that a pipe is being welded the lower section of the pipe next to be welded is positioned on the assembly table, and when the mandrel is withdrawn from the welding machine it is moved over the assembly table and lies in the bottom section of pipe thereon.

In the accompanying drawings, illustrating the present preferred embodiment of my invention, Figure 1 is a top plan view of the welding machine with the rack, the assembly and run-out tables, and the mandrel moving device;

Figure 2 is a side elevation thereof;

Figure 4 is a side elevation showing the connection between the mandrel and the mandrel moving device;

Figure 5 is a top plan view thereof;

Figure 6 is a vertical longitudinal section through a portion of the welding machine;

Figure 7 is a transverse view showing the mandrel and assemblage of pipe sections in position on the conveyor; and Figure 8 is a similar view showing the pipe sections in position to be welded.

Figure 3:
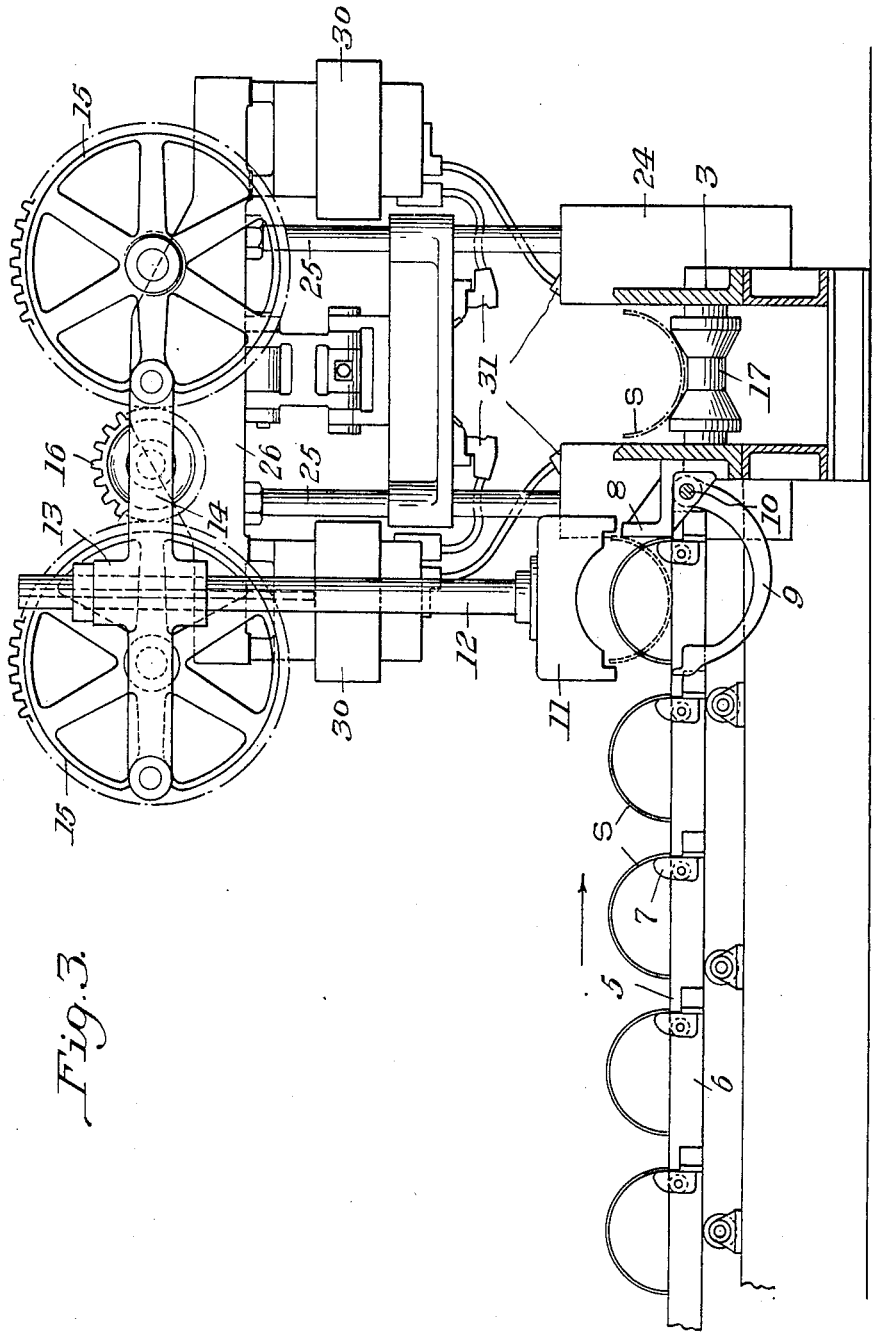
Figure 3 is a view to enlarged scale showing the rack and the transfer mechanism.

Referring first to Figures 1, 2 and 3, there is shown a flash welding machine indicated generally by the reference character 2, having an assembly table 3 at one end thereof and a run-out table 4 at the other end. A rack 5 for pipe sections is arranged alongside the assembly table 3. This table is of a well-known type, consisting of shuffle bars 6 having reciprocating dogs 7 thereon, whereby pipe sections S are moved in the direction of the arrow against a stop 8. A series of arms 9 on a shaft 10 engages one of the edges of the pipe sections and lifts said edge upwardly. Continued movement of the shaft 10 causes the pipe section to turn completely over and lie in the dotted line position of Figure 3. It is then engaged by a magnet 11 carried by rods 12 slidable in heads 13 on links 14. The links 14 are connected to gear wheels 15 adapted to be rotated in either direction by pinions 16. When the pipe section has been engaged by the magnets 11, the gear wheels 15 are turned in a clockwise direction to raise the section from the rack 5 and move it over the rollers 17 of the assembly table 3. A mandrel is then placed in the lower pipe section, and the upper section is put in place. This upper section is carried from the rack 5 to the assembly table 3, but is not turned over by the arms 9.

The mandrel, hereinafter described in detail, is indicated generally by the reference character 18. It is provided with a tongue 19 adapted to be engaged by a head 20 on a rack 21. The rack 21 may be moved in either direction by a motor 22 so as to cause the mandrel to move to the right or the left. When the mandrel is moved to the right, as viewed in the drawings, it carries the assembled pipe sections into the welding machine 2. After the pipe has been welded in the machine 2, the mandrel 18 is withdrawn, being moved over the assembly table so as to lie in the bottom section of the pipe which is next to be welded. Conveyor rolls 23 in the welding machine are then actuated to move the completed pipe P onto the run-out table 4.

The welding machine proper consists of bottom frame members 24 having upstanding posts 25 carrying head sections 26. Bottom holders 27 are pivoted in the frame members 24 at 28, and top holders 29 are slidably mounted on the posts 25. Transformers 30 are carried on the head members 26 and lie alongside of the top holders 29. The holders 27 and 29 carry electrodes 31, suitably insulated, and connected to the transformers 30 by flexible leads 32. It will be noted from Figures 7 and 8 that the leads are very short and are subjected to a minimum of flexing in operation.

The rollers 23 are of the well-known motor driven type, being mounted on ball bearings 33 and having an electric motor 34 built inside of the rollers 23, whereby the rollers may idle freely, or, when current is applied, act as positive conveyors for moving the pipe out of the machine.

Air cylinders 35 are positioned at spaced points along the machine, each cylinder having a piston 36 carrying a head 37 adapted to engage the bottom pipe section S to lift the assemblage of pipe sections and the mandrel therein to the dotted line position of Figure 7. After the pipe sections have been raised, the lower holders 27 are swung into the position of Figure 8. This movement is accomplished by the rotation of shafts 38 carrying arms 39 which are connected to the holders 27 by links 40. The holders 27 and 29 are provided with insulating blocks 41, whereby current supplied to the pipe sections from the electrodes 31 is confined to the pipe sections, and stray currents are minimized.

It will be noted from Figure 8 that the electrodes on the top and bottom holders terminate very close to the edges of the pipe sections. It would be difficult, if not impossible, to get a close fit between the electrodes and the pipe sections if the pipe were merely moved to the position of Figure 8 because of interference of the electrodes during the swinging movement with the bottom pipe section. In order to avoid this, the pipe sections are raised beyond the position in which they are to be welded, after which the bottom holders 27 are swung into place and the pipe sections with the mandrel therein are lowered. I have shown in Figure 8 the dotted line position to which the pipe is raised.

After the pipe sections with the mandrel therein have been lowered onto the bottom holders 27, the top holders 29 are brought down. The movement of the top holders is effected by toggle links 42 pivoted to the holders at 43 and to the top frame members at 44. The toggles are connected together by links 45 adapted to work in tension or compression and moved in any desired manner, as by an oil gear, not shown. Oil gears are well known and any desired control mechanism may be employed.

Referring now more particularly to the mandrel 18, it comprises a bottom section 46 and a top section 47 adapted to engage the pipe sections intermediate their edges. The bottom section 46 carries spaced air cylinders 48 in which there are mounted pistons 49 whose rods are connected to the top section 47 at 50. Air pipes 51, having connection with the top and bottom of the cylinders 48, are provided whereby the pistons 49 may be raised or lowered as desired. In operation the pistons 49 are initially raised and pressure is maintained beneath the pistons from the time that the pipe sections are fed into the machine until the welding has been completed. This serves to hold the pipe sections separated as long as desired, but the top section is free to yield when the toggle mechanism for the upper holders is actuated so that the pipe sections may be brought together.

In order to insure proper electrical contact between the pipe sections and the electrodes 31, the mandrel is provided with portions 52 which engage the pipe sections adjacent their edges. The portions 52 are pivotally connected to the top and bottom portions 46 and 47 by links 53. They are additionally provided with links 54 by which they are connected to cylinders and pistons lying intermediate the cylinders and pistons 48 and 49. The upper portions 52 are connected through their links 54 to cylinders 55 formed in a central mandrel member 56; while the lower portions 52 are connected through their links 54 to brackets 57 on the rods 58 of pistons in the cylinders 55. Air pipes 59 are connected to the top and bottom of the cylinders 55 whereby the portions 52 may be urged inwardly or outwardly as desired. When an assemblage of pipe sections is in the embrace of the holders, the mandrel portions 52 are urged outwardly so as to force the edges of the pipe sections against the electrodes. By reason of the fact that the air pressure provides a holding force, the desired pressure is maintained despite the fact that the top and bottom sections 46 and 47 are moved together during the welding operation.

After the welding has been completed, the mandrel is collapsed and the toggle 42 is actuated to raise the upper holder. The pistons 36 are then moved upwardly so as to raise the pipe to the dotted line position of Figure 7, thereby permitting the bottom holders 37 to be swung downwardly without interference between the electrodes and the pipe. The pipe is then lowered onto the rollers 23.

In Figure 2 the mandrel is shown in its elevated position in dotted lines. When the mandrel is lowered, the tongue 19 engages the head 20 of the rack 21, so that the mandrel, while in the machine, is connected to the mandrel moving device. The mandrel is then withdrawn by holding the pipe in any desired manner against movement to the left as viewed in the drawings. Current is then applied to the rollers 23 so as to carry the pipe onto the run-out table 4.

I have illustrated and described a present preferred embodiment of the invention. It will be understood, however, that the invention is not limited to the particular form shown but may be otherwise embodied or practiced within the scope of the following claims.

I claim:

1. In a pipe welding machine, a mandrel comprising a portion adapted to engage a semi-cylindrical pipe section intermediate its longitudinal edges, and other portions mounted on the first mentioned portion but movable relative thereto and adapted to engage the edge portions of the pipe section, and means for yieldingly urging all of said portions outwardly.

2. In a pipe welding machine, a sectional mandrel having independent portions adapted to engage oppositely disposed pipe sections intermediate their edges and having other independent portions adapted to engage the pipe sections adjacent their edges, and a plurality of pistons operating in cylinders within the mandrel for expanding and contracting at least some of said portions.

3. In a welding machine, pivoted holders for assembled pipe sections to be welded, a toggle mechanism for swinging said holders, other holders adapted to cooperate with those first mentioned and disposed oppositely thereto, and toggle mechanism for forcing the second mentioned holders toward the first mentioned holders to grip said sections therebetween.

4. In a welding machine, the combination with swinging holders, toggles for moving the holders and means for extending the toggles to rigidly position the holders, of other holders disposed oppositely thereto and toggle means for moving them toward the first mentioned holders.

5. Pipe welding apparatus comprising a frame, a pair of holders pivoted thereto for engaging and supporting a pipe section, a mandrel adapted to have pipe sections placed thereabout, means for moving said mandrel and assembled pipe sections between said holders, means for moving said holders into engagement with one section, and movable means for engaging another section.

6. Pipe welding apparatus comprising a frame having head and base castings, a transformer supported thereon, holders pivotally supported on said castings for engaging pipe sections assembled on a mandrel movable therebetween, electrodes on said holders and flexible connections between said electrodes and transformer.

7. Apparatus for welding pipe comprising a frame, electrode holders movably mounted in said frame, pipe blank holders pivotally mounted in said frame below said electrode holders, means for positioning pipe blanks to be engaged and supported by said pipe blank holders, and means for operating said electrode holders to grip the blank.

8. Pipe welding apparatus including a conveyor for feeding pipe sections, an assembly table, a lifter for transferring pipe sections from the conveyor to the table, a mandrel movable to and away from the table, and means for disposing the mandrel within one of said sections on the table in position to receive and support another section in assembled relation thereto.

9. Pipe welding apparatus comprising a welder having means for engaging a length of pipe along a seam to be welded, a table for holding pipe sections for delivery to the welder, a contractible mandrel for supporting the sections in assembled relation, means for contracting the mandrel for movement free of the pipe, and means for moving the mandrel.

10. Pipe welding apparatus comprising a welder having means for engaging a length of pipe along a seam to be welded, a table for holding pipe sections for delivery to the welder, and a mandrel traversing said table for supporting the sections in assembled relation.

11. Pipe welding apparatus comprising a welder, a table for delivering pipe sections to the welder, a mandrel for supporting said sections, and means separably engaging the mandrel for shifting it axially into the welder.

12. Pipe welding apparatus comprising a welder, a table for delivering pipe sections to the welder, a mandrel for supporting said sections in the welder, means for delivering sections to the table including a transfer device having a concavity for engaging the curved portion of a section and recesses for engaging the edge portions thereof.

13. Pipe welding apparatus comprising a welder, a table for delivering pipe sections to the welder, a mandrel movable over the table for supporting said sections, means for delivering sections to the table including a transfer device having a concavity for engaging the curved portion of a section and recesses for engaging the edge portions thereof, and means for reversing the position of said sections.

14. Pipe welding apparatus comprising a welder, a table for delivering pipe sections to the welder, a mandrel movable over the table for supporting said sections, a rack for supplying pipe sections to the table, means for reversing the position of sections thereon, and transfer means between the rack and table including a magnetic lift engageable with the curved surface or the edge portions of a section.

15. In a pipe welding apparatus, the combination with pipe blank supporting holders, pipe blank engaging holders and an expansible mandrel for internally supporting pipe blanks, of means for moving pipe blanks assembled on said mandrel into welding position, and means for operating said pipe blank supporting holders and said pipe blank engaging holders for gripping the blanks.

JOHN W. FREE.